United States Patent [19]

Asatsuma

[11] Patent Number: 5,050,373
[45] Date of Patent: Sep. 24, 1991

[54] MOWING APPARATUS HAVING UNIFORMLY MOVING CUTTING TEETH

[75] Inventor: Kinpei Asatsuma, Kanagawa, Japan

[73] Assignee: Komatsu Zenoah Company, Tokyo, Japan

[21] Appl. No.: 524,790

[22] Filed: May 17, 1990

[30] Foreign Application Priority Data

Nov. 18, 1988 [JP] Japan .............................. 63-290277

[51] Int. Cl.⁵ ............................................ A01D 34/30
[52] U.S. Cl. ...................................... 56/17.6; 56/246; 56/257; 56/264; 30/210; 30/242
[58] Field of Search ...................... 56/10.5, 11.1, 11.2, 56/17.6, 232, 236, 246-248, 257, 264, 266, 293, 296, 297; 30/208-210, 241, 242

[56] References Cited

U.S. PATENT DOCUMENTS

| | | |
|---|---|---|
| 1,110,058 | 9/1914 | Hurley . |
| 2,119,683 | 6/1938 | Nevraumont . |
| 2,976,665 | 3/1961 | Speckman . |
| 3,023,563 | 3/1962 | Tenney .................... 30/210 |
| 3,023,564 | 3/1962 | Tenney et al. ............ 56/17.6 |
| 3,083,456 | 4/1963 | Marchant .................. 30/210 |
| 3,472,007 | 10/1969 | Green . |
| 3,513,917 | 5/1970 | Stober ....................... 172/101 |
| 3,536,690 | 11/1970 | Hinks et al. . |
| 3,618,304 | 11/1971 | Hundhausen . |
| 3,631,658 | 1/1972 | Green . |
| 3,701,238 | 10/1972 | Hintze Jr. . |
| 3,740,936 | 6/1973 | Berger . |
| 3,857,177 | 12/1974 | Karubian et al. . |
| 3,934,340 | 1/1976 | Jones et al. ................ 30/220 |
| 4,004,065 | 6/1978 | Geary ........................ 30/210 |
| 4,107,906 | 8/1978 | Cousino ..................... 56/246 |
| 4,196,566 | 4/1980 | Donnelley . |
| 4,310,999 | 1/1982 | Onoue . |
| 4,451,983 | 6/1984 | Johnson et al. . |
| 4,848,846 | 7/1989 | Yamada et al. . |
| 4,868,988 | 9/1989 | Han ........................... 30/210 |

FOREIGN PATENT DOCUMENTS

| | | |
|---|---|---|
| 28443 | 4/1970 | Australia . |
| 476883 | 9/1976 | Australia . |
| 68701 | 10/1981 | Australia . |
| 522302 | 5/1982 | Australia . |
| 320330 | 2/1975 | Austria . |
| 0117848 | 9/1984 | European Pat. Off. . |
| 0257566 | 3/1988 | European Pat. Off. . |
| 0337428 | 10/1989 | European Pat. Off. . |
| 1482805 | 5/1969 | Fed. Rep. of Germany . |
| 2058984 | 6/1972 | Fed. Rep. of Germany . |
| 3812272 | 11/1988 | Fed. Rep. of Germany . |
| 2267690 | 11/1975 | France . |
| 2357162 | 6/1977 | France . |
| 516273 | 1/1972 | Switzerland . |
| 2199226 | 7/1988 | United Kingdom . |
| 89-09538 | 10/1989 | World Int. Prop. O. . |

Primary Examiner—Bruce M. Kisliuk
Attorney, Agent, or Firm—Sandler, Greenblum & Bernstein

[57] ABSTRACT

Disclosed is a mowing apparatus, which includes a pair of first and second cutting members slidably superposed with each other, each of the members including a plurality of aligned cutting teeth; mechanism for moving the first cutting member relative to the second cutting member reciprocably within a predetermined range in the direction of the aligned cutting teeth at a substantially uniform speed; and a drive source for driving the moving mechanism. The moving mechanism includes a solenoid actuator having first and second coils and a plunger provided reciprocatingly movably between the first and second coils. The plunger is connected to the first cutting member. The moving mechanism further includes a switch alternately switches the first and second coils ON, thereby causing the first and second coils to become magnetized alternately to attract the plunger alternately so that the first cutting member to which the plunger is coupled is moved at a substantially uniform speed in accordance with the motion of the plunger.

20 Claims, 6 Drawing Sheets

MOWING APPARATUS HAVING UNIFORMLY MOVING CUTTING TEETH

BACKGROUND OF THE INVENTION

1. Field of the Invention

The present invention relates to a mowing apparatus with two oscillatable cutting members.

2. Description of the Prior Art

Figure 1:
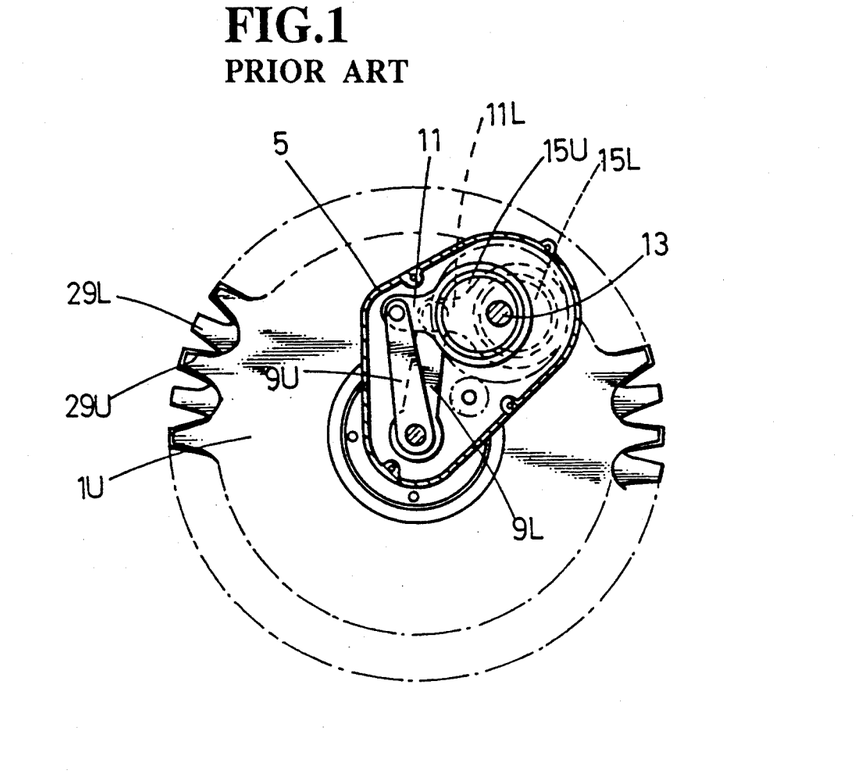
FIG. 1 is a sectional plan view of the main parts of a conventional mowing apparatus.
Figure 2:
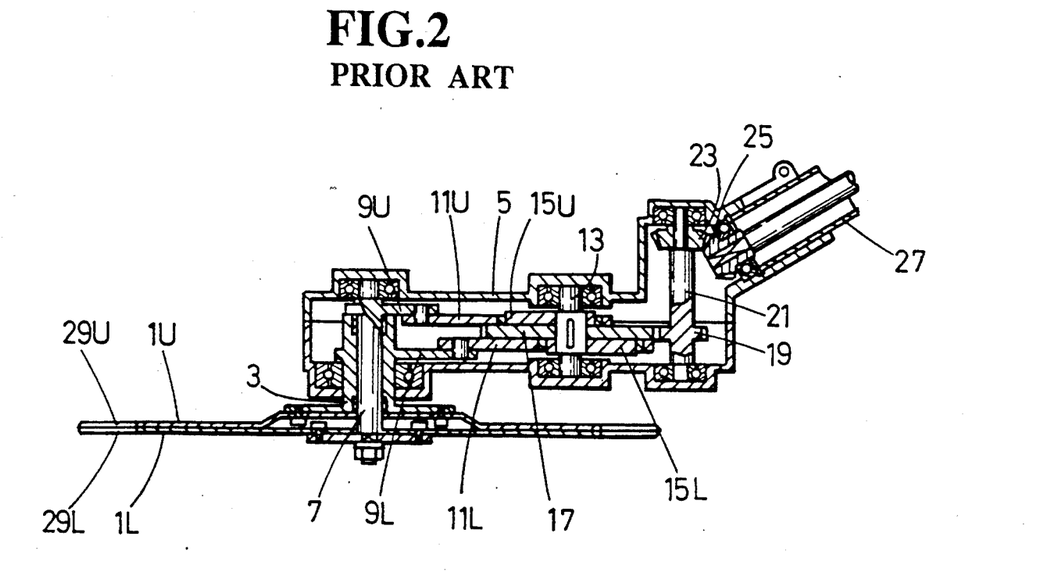
FIG. 2 is a sectional elevation of the same conventional mowing apparatus.

One example of an oscillative mowing apparatus is illustrated in European Patent Application No. 87112105.9 filed by the applicant of the present invention. First and second superposed cutting disks are used in the mowing apparatus of that patent application. The two cutting disks oscillate in opposite directions within a predetermined oscillating range, through a crank mechanism. Specifically, as shown in FIGS. 1 and 2, a tubular first shaft 3 is integrally provided at the center of a first cutting disk 1U. The first shaft 3 is rotatably provided in a casing 5 through a bearing. Also, a second shaft 7 is integrally provided at the center of a second cutting disk 1L, and the second shaft 7 is rotatably inserted into the first shaft 3 in the axial direction. The bases of a first arm 9U and a second arm 9L are integrally mounted on the first and second shafts 3, 7 respectively. The tip of the first arm 9U is connected to a first link 11U and the tip of the second arm 9L is connected to a second link 11L. A cam shaft 13 provided with two circular eccentric cams 15U, 15L is installed in the casing 5. The first and second links 11U, 11L are slidably fitted into the circular eccentric cams 15U, 15L, respectively. The cam shaft 13 is connected to a motive power source through a large gear 17, a small gear 19, an intermediate shaft 21, a bevel gear 23, a bevel gear 25, and a drive shaft 27.

In the above structure, the rotational motion of the motive power source is transmitted to the cam shaft 13, causing the cam shaft 13 to rotate. The two eccentric cams 15U, 15L rotate as a result of the rotational motion of the cam shaft 13, and the first and second arms 9U, 9L are reciprocatingly pivoted in opposite directions through the first and second links 11U, 11L. Then, the first and second cutting disks 1U, 1L oscillate reciprocatingly in opposite directions through the pivoting action of the arms 9U, 9L, thereby enabling to cut grass between the teeth of the upper and lower cutting disks as scissors.

Figure 3:
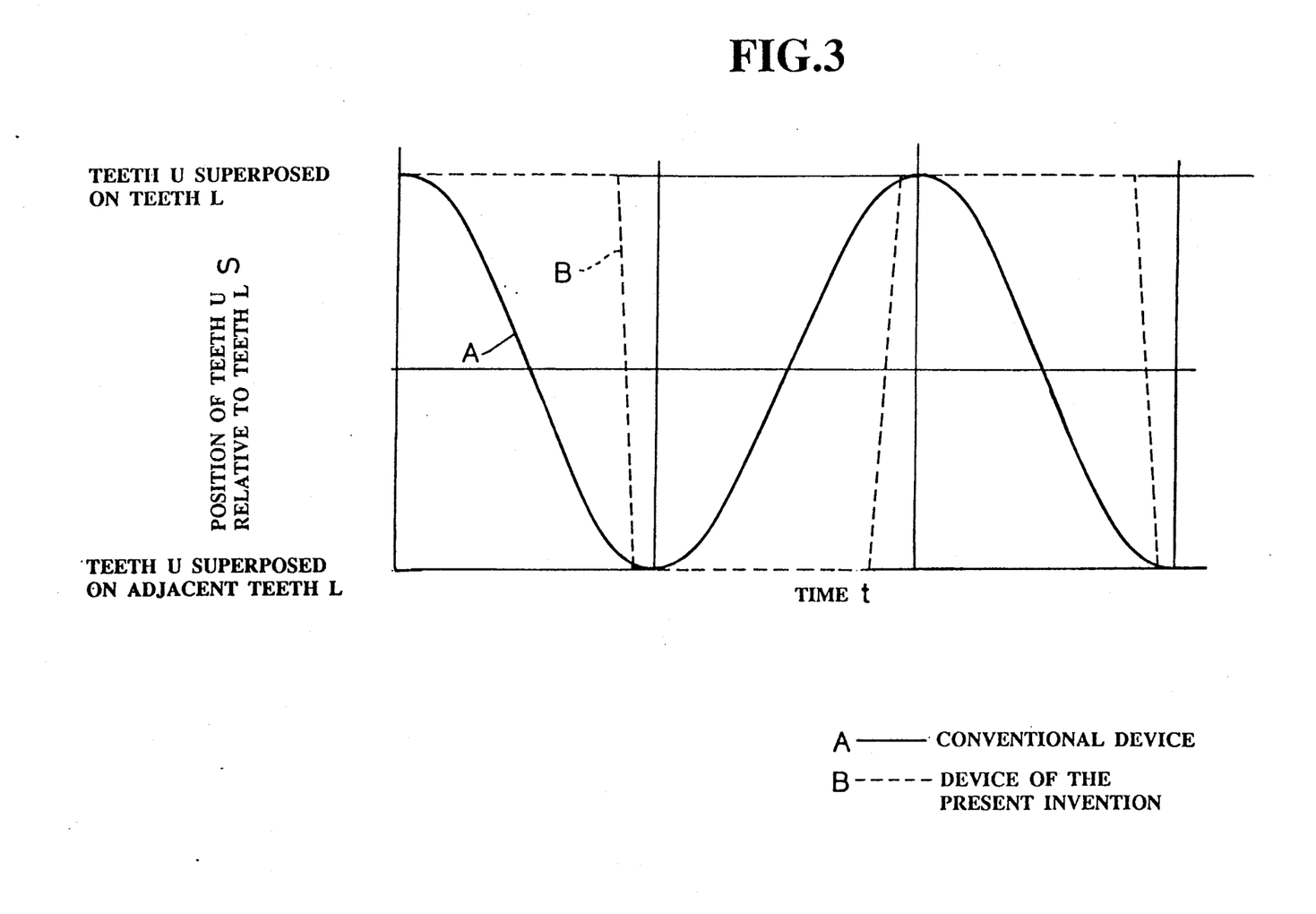
FIG. 3 is a graph showing the relative position of the upper and lower moving cutting teeth versus time for the conventional mowing apparatus and for the mowing apparatus of the present invention.

The conventional mowing apparatus described above is highly superior in safety of operation. However, in the conventional mowing apparatus, the relative positional relationship of the teeth of the upper and lower cutting disks during the oscillating action of the cutting disks of this mowing apparatus, as indicated by the solid line "A" in FIG. 3, is represented in the form of a sine curve. Specifically, in the conventional mowing apparatus, the upper teeth 29U move relatively from one superposed state in which the upper teeth 29U are superposed on the lower teeth 29L (this state corresponds to the top or the bottom of the sine curve) to the next superposed state in which the upper teeth 29U are superposed on the adjacent lower teeth 29L (this state corresponds to the bottom or the top of the sine curve). Then the upper teeth 29U move in the reverse direction toward the first superposed state and are once again superposed on the previous lower teeth 29L. At this time, the motion of the upper and lower teeth 29U, 29L, slows down according as the superposed position (the top or the bottom of the sine curve) is approached, and the moving speed becomes highest when the upper and lower teeth are in alternate positions (this state corresponds to the middle portion of the sine curve). In this case, it is apparent that slope of the curve represents moving speed of the cutting teeth. Therefore, in the conventional mowing apparatus, the moving speed of the cutting teeth when the upper teeth 29U are superposed on the lower teeth 29L becomes extremely low. Grass is being cut by the teeth just before the superposed states. This means that the grass is being cut by the relatively low moving speed of the cutting teeth.

Accordingly, in the conventional mowing apparatus, there is a problem that the highest moving speed of the cutting teeth could not be used in the grass cutting operation. Further, because the moving speed of the cutting teeth is slow before and after the teeth reach the superposed position and there is no stationary state when the teeth of the upper and lower cutting disks are superposed, the duration of the period when the upper and lower teeth 29U, 29L are fully superposed (this state corresponding to the top or bottom of the sine curve) is short. For this reason, only a short time is available to the cutting disks in the condition where there is a wide space between each of the teeth 29U and each of the teeth 29L, which is necessary to receive the grass to be cut between the teeth as much as possible.

SUMMARY OF THE INVENTION

A main object of the present invention is to provide, with due consideration to the problem of such conventional apparatus, a mowing apparatus provided with two upper and lower oscillating cutting members each having a plurality of cutting teeth wherein, when grass is cut by the teeth between the teeth of the cutting members, the moving speed of the cutting teeth is substantially uniform.

Another object of the present invention is to provide a mowing apparatus wherein in order to adequately cut grass, there is a long time interval in the condition where a wide space occurs between the upper and lower teeth, in which the teeth of the upper and lower cutting members are superposed.

These objects are achieved in the present invention by the mowing apparatus comprising (1) a pair of first and second cutting members slidably superposed with each other, each of the members including a plurality of aligned cutting teeth; (2) means for moving the first cutting member relative to the second cutting member reciprocably within a predetermined range in the direction of the aligned cutting teeth at a substantially uniform speed; and (3) a drive source for driving the moving means.

As a result, the cutting members of the mowing apparatus can move at a substantially uniform speed relative to each other, which does not have substantially decelerating motion. Accordingly, the teeth of the upper and lower cutting members are superposed in such a manner that the moving speed of the teeth of the cutting members when the teeth of the cutting members are about to be superposed with each other, that is the moving speed of the teeth in the grass cutting operation is not reduced. The cutting members therefore provide a superior cutting force.

Further, by providing halting means for halting the motion of the cutting member when the upper and lower teeth are superposed a long time interval can be provided when the upper and lower teeth are superposed, in which the space between the teeth is wide. Accordingly, the grass to be cut easily enters between the teeth, and the amount of uncut grass becomes small.

Furthermore, the operator can change the cycle of the motion of the cutting members as required without changing the speed of the motion. Therefore, even when the cycle of the motion is modified, the cutting force of the cutting teeth is maintained, and the operator can easily operate the mowing apparatus.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Now referring to the drawings, preferred embodiments according to the present invention will be explained.

Figure 4:
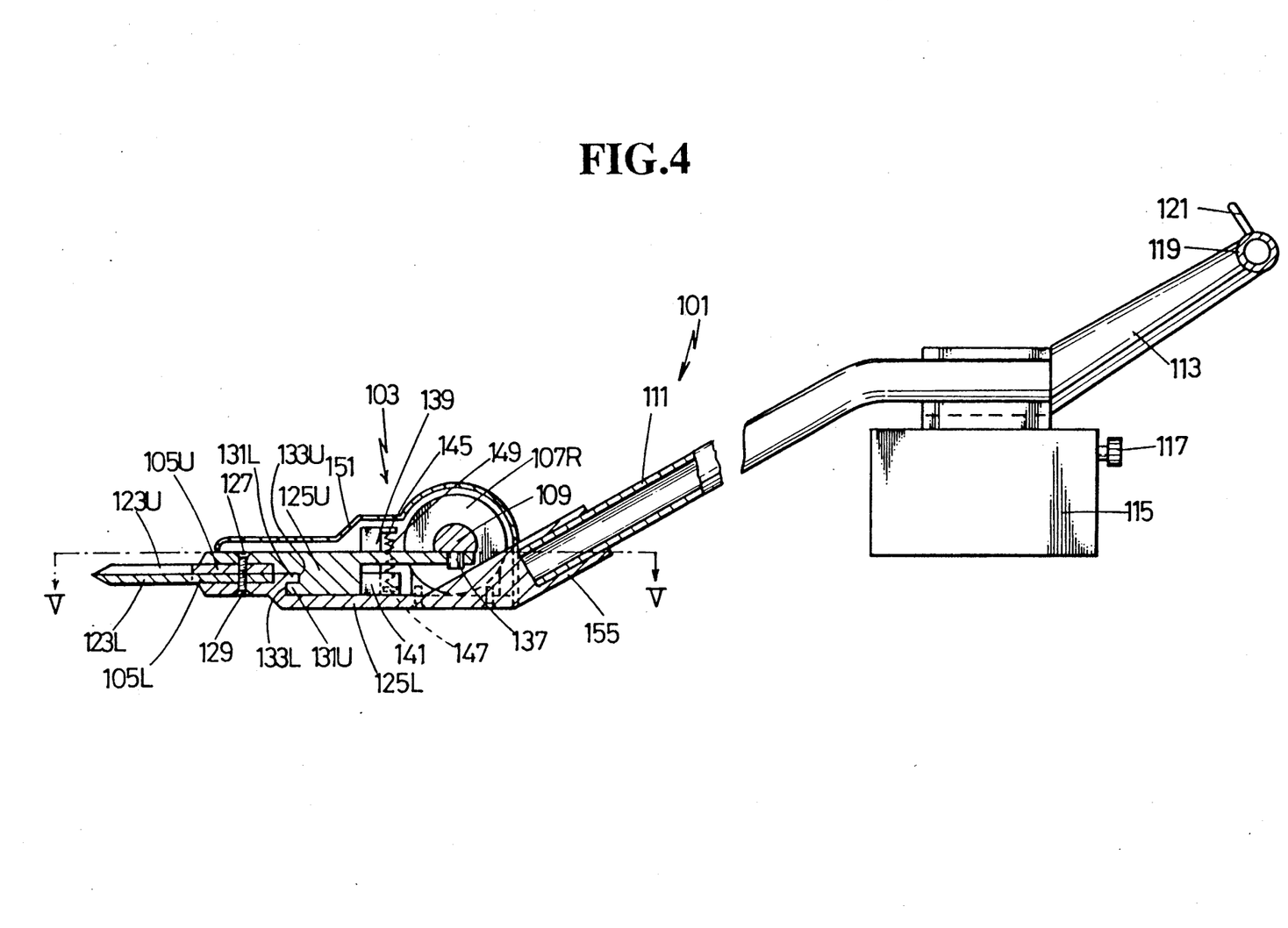
FIG. 4 is a sectional side elevation of a first embodiment of the mowing apparatus of the present invention.
Figure 5:
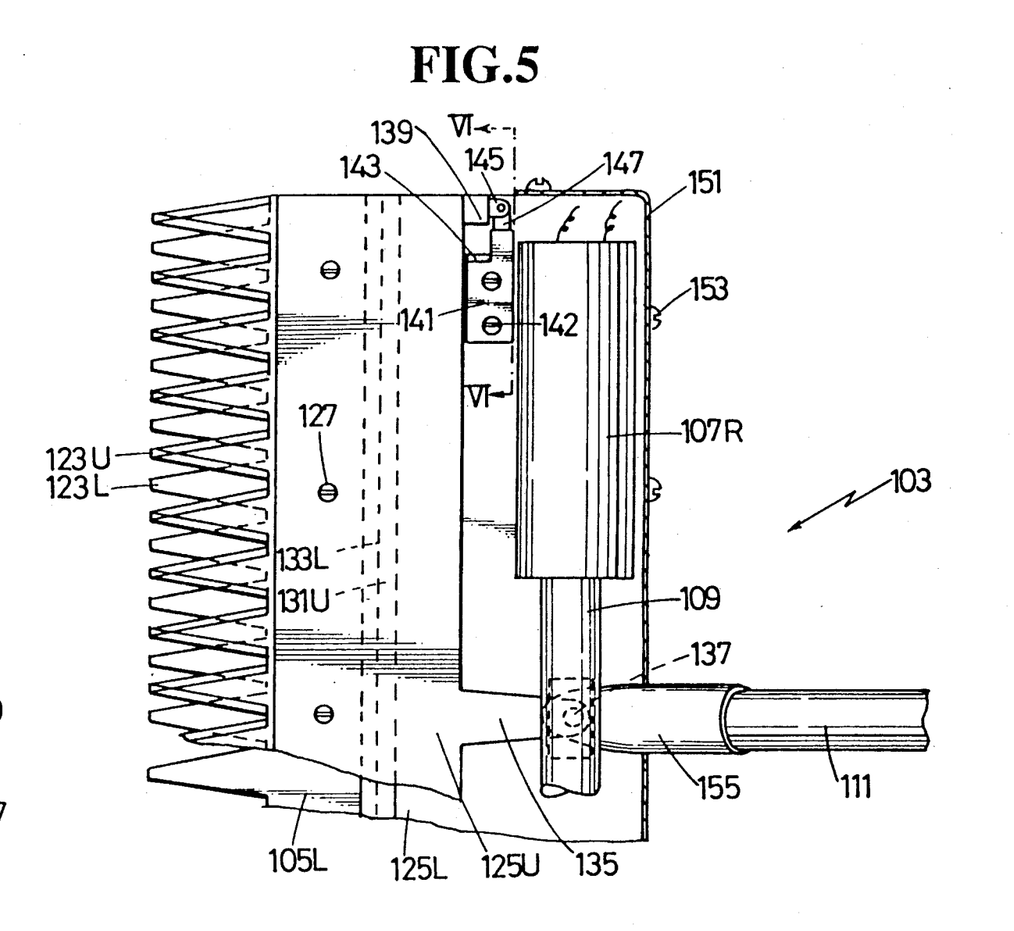
FIG. 5 is a sectional plan view taken along the line V—V of FIG. 4.

FIGS. 4 and 5 show a mowing apparatus 101 as a first embodiment of the mowing apparatus of the present invention.

Namely, a pair of first cutting member 105U and second cutting member 105L are installed on the front (the left side in FIGS. 4 and 5) of a body 103 of the mowing apparatus 101. Various types of hydraulic or electrical actuators can be used as means for moving the first cutting member 105U in the lateral direction at a substantially uniform speed. However, in this embodiment, a solenoid mechanism comprising a coil 107R and a plunger 109 is used as the moving means. A hollow operation rod 111 is mounted on the body 103 and extending to the upper rear. A handle 113 and a control unit 115 for the solenoid mechanism are mounted at the rear portion of the operation rod 111. The solenoid mechanism in the body 103 and the control unit 115 are electrically connected by a wiring system (not shown in the drawing) running through the hollow operation rod 111. The control unit 115 is provided with an adjusting knob 117 for adjusting moving cycle of the first cutting member 105U. A main switch 121 for the control unit 115 is mounted on a grip 119 provided on the handle 113.

Figure 6:
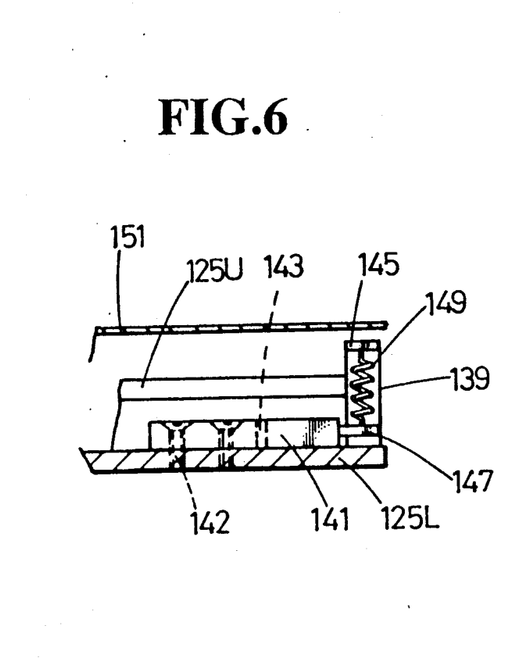
FIG. 6 is a sectional elevation view taken along the line VI—VI in FIG. 5.

A more detailed explanation will now be given with reference to FIGS. 4 to 6. The first and second cutting members 105U and 105L of the mowing apparatus 101 are provided with a plurality of teeth 123U, 123L arranged at a uniform spacing in a straight line. The first cutting member 105U is secured by a screw 127 to the front of a first plate 125U in such a way that the teeth 123U are located on the front side of the apparatus. The second cutting member 105L is secured by a screw 129 to the front of a second plate 125L. The first plate 125U is provided with a channel 133U, which extends laterally, parallel to the teeth 123 of the cutting members 105, and is also provided with a projection 131U. The second plate 125L is provided with a channel 133L, which extends laterally, parallel to the teeth 123 of the cutting members 105, and is also provided with a projection 131L. The projection 131U is slidably guided in the lateral direction in the channel 133L and the projection 131L is slidably guided in the relative lateral direction in the channel 133U. Accordingly, the first plate 125U can slide in the direction of the aligned teeth 123 of the cutting members 105 (the lateral direction) relative to the second plate 125L.

Figure 7:
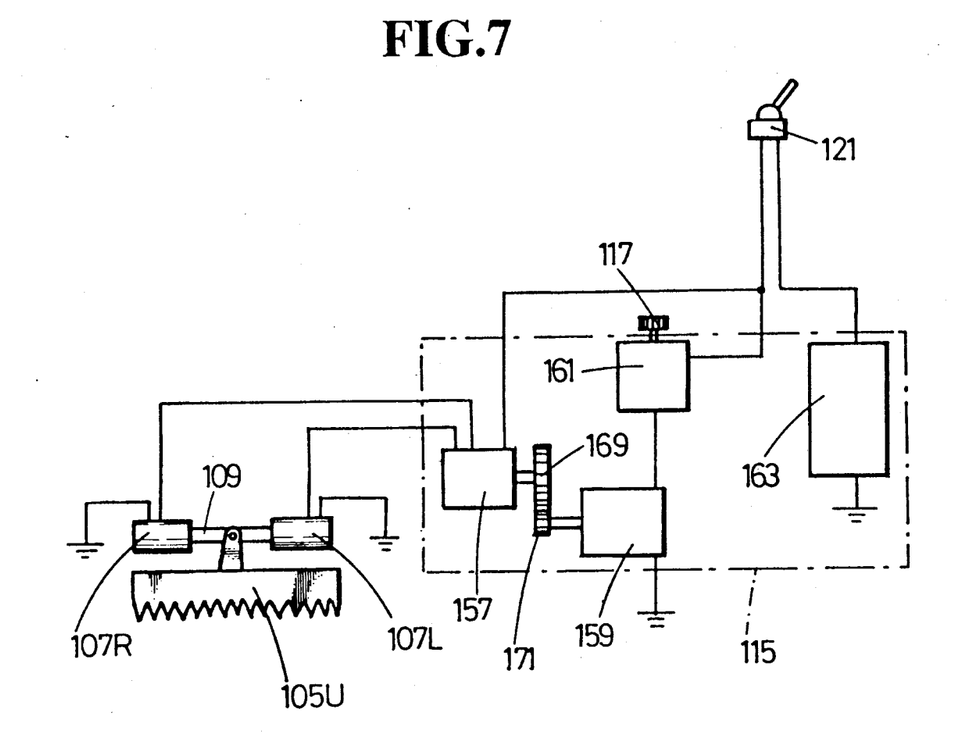
FIG. 7 is a configuration diagram of a control unit of the first embodiment of the mowing apparatus of the present invention.

A bracket 135 is integrally provided at the rear center portion of the first plate 125U, extending to the rear. The rear end of the bracket 135 is connected to moving means. In this embodiment of the present invention, the solenoid mechanism comprising a pair of coils 107R, 107L and one plunger 109 which moves between the coils 107R, 107L is used (FIG. 7). The plunger 109 of the solenoid mechanism is mounted on the rear end of the bracket 135 by a pin 137 at the central portion of the plunger 109, and runs in the direction of the aligned teeth 123 of the cutting members 105. The first and second coils 107R, 107L are secured to the second plate 125L, parallel to the line of the teeth 123 of the cutting members 105 and the two ends of the plunger 109 are inserted into the first and second coils 107R, 107L, respectively.

In accordance with this structure, when a current flows in the first coil 107R, the first coil 107R is magnetized, and the plunger 109 is attracted into the first coil 107R, then abuts a stopper (not shown in the drawing) included in the first coil 107R without decelerating motion to be halted its motion while the current flows in the first coil 107R. The current in the first coil 107R is then cut, and then a current flows in the second coil 107L and the second coil 107L is then magentized, so that the plunger 109 is attracted forward the second coil 107L, then stopped by a stopper included in the second coil 107L without decelerating motion. Accordingly, when a current is caused to flow in the first and second coils 107R, 107L alternately, the plunger 109 is reciprocatingly attracted to the coils 107R, 107L, and halted. The first cutting member 105U is also moved in the direction of the line of the teeth 123, and halted. The reciprocating stroke of the plunger is approximately adjusted to the moving range of the first cutting member relative to the second cutting member so that the first cutting member is immediately halted when the teeth of the first and second cutting members reach in the superposed condition.

A rear-projecting stopper 139 is integrally provided on the rear side portions of both the right and left ends of the first plate 125U. A positioning member 141 is mounted on the second plate 125L with a screw 142 inside inwardly of the each of the stoppers 139. The left positioning member 141 is secured in the position where it abuts the left stopper 139 of the first plate 125U when the teeth 123U of the first cutting member 105U are exactly superposed on the teeth 123L of the second cutting member 105L. The right positioning member 141 is secured in the position where the right stopper 139 of the first plate 125U abuts the right positioning member 141 when the teeth 123U of the first cutting member 105U are exactly superposed on the adjacent teeth 123L of the second cutting member 105L. The positioning members 141 are each provided with an elastic body 143 as shock absorbing member (which is consisted of rubber, in this embodiment) at the abuted portion thereof.

In the above construction, when the stoppers 139 abut the positioning members 141 the motion of the first cutting member 105L is halted exactly. Therefore, the range of the reciprocal motion of the cutting member 105U when the current flows alternately through the first and second coils 107R, 107L, is reliably restricted by the stoppers 139 and the positioning members 141 between the two positions at which the upper teeth 123U and the lower teeth 123L of the cutting members 105U, 105L are overlapped with each other, respectively.

In addition, a bracket 145 is provided on the upper part of the rear side of each of the stoppers 139, projecting rearwardly. Also, an outward-projecting bracket 147 is provided on each of the positioning members 141. As shown in FIG. 4, biasing means is mounted between the brackets 145 and 147. In this embodiment, a spring 149, each end of which is connected to each of the brackets 145, 147, is used as the biasing means. The spring 149 pull the bracket 145 and the bracket 147 together so that the first and second cutting members 105U, 105L are pressed together, thereby preventing the first cutting member 105U from floating.

A cover 151 which covers the first plate 125U is secured to the second plate 125L by screws 153. Accordingly, it is possible to prevent the moving means of the cutting members 105 from being damaged by twigs, rocks and the like.

A boss 155, on which the hollow operation rod 111 is mounted, is integrally formed at the rear center of the second plate 125L. The control unit 115 is provided on the rear end of the operation rod 111. The control unit 115 is electrically connected to the coils 107R, 107L in the body 103 which pass through the operation rod 111. The main switch 121 of the control unit 115 is provided on the grip 119 of the handle 113 installed on the operation rod 111.

Figure 8:
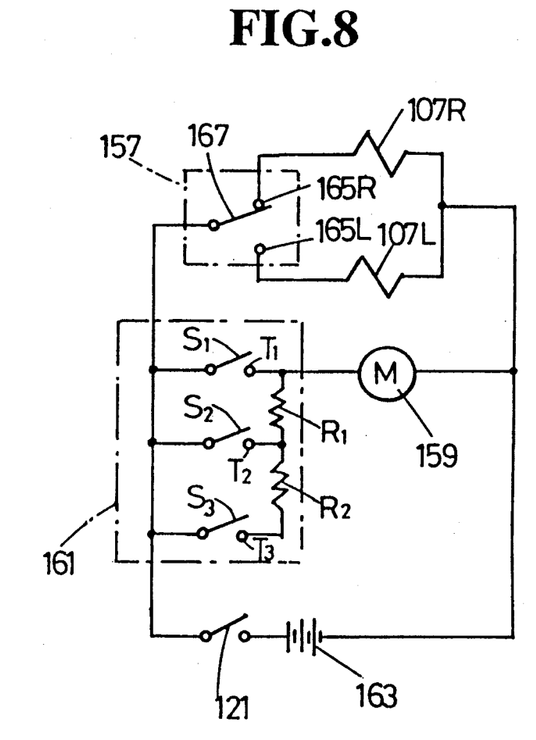
FIG. 8 is a circuit drawing of the first embodiment of the mowing apparatus of the present invention.

The configuration of the control unit 115 is shown in FIG. 7. FIG. 8 is a circuit diagram for the control unit 115. The control unit 115 in a unit casing comprises a rotary switch 157 which serves as the switching means for the solenoid mechanism, a motor 159 which serves as means for cyclically repeating the switching of the rotary switch, and a variable resistance device 161 for changing the rotation speed of the motor 159. A battery 163 is also contained in the unit casing as a drive source for the moving means. The rotary switch 157 can be electrically connected to or isolated from the coils 107R, 107L and the battery 163.

In detail, the rotary switch 157 includes a pair of bank connection terminals 165R, 165L and a wiper 167. The connection terminals 165R, 165L are electrically connected to the coils 107R, 107L of the solenoid. The wiper 167 is electrically connected to the battery 163. The wiper 167 of the rotary switch is coupled to the motor 159 via a large gear 169 and a small gear 171 so that the wiper 167 is rotated according to the rotation of the motor 159. As the motor 159 rotates, the wiper 167 rotates and is alternately connected to the connection terminals 165R and 165L. As a result, the first and second coils 107R, 107L of the solenoid are alternately magnetized.

The motor 159 is electrically connected to the battery 163 through the variable resistance device 161. In this embodiment of the present invention, as the variable resistance device 161, a circuit containing two resistances R1, R2 is utilized. Specifically, the resistances R1, R2 in the device 161 are connected in series, and one end of the series is connected to the motor 159. Three connection terminals T1, T2, and T3 are provided, one at each end of the resistance R1-R2 series, and one between the resistances R1 and R2. Three switches S1, S2, and S3 are provided for selectively switching the three connection terminals T1, T2, and T3. Each of the switches S1, S2, S3 can be selectively switched by means of the adjusting knob 117 and is connected to the battery 163 through the main switch 121 mounted on the grip 119. Three different circuit resistance values for the variable resistance device 161 can be obtained by switching the connected switch using the adjusting knob 117; this results in three different currents being applied to the motor 159 through the device 161. Accordingly, the motor 159 can be switched to three different rotational speeds resulting in three switching cycles for the rotary switch 157.

The operation of this embodiment will now be explained, based on the foregoing configuration. When the operator throws the main switch 121 the motor 159 rotates at the speed set by the adjustment knob 117. The wiper 167 of the rotary switch 157 rotates with the rotation of the motor 159, and is alternatively connected to the first and second coils 107R, 107L based on the specified switching cycle set on the connection terminals 165R, 165L. The first and second coils 107R, 107L are magnetized alternately as the current passes through them. When the first coil 107R is magnetized, the plunger 109 is attracted into the first coil 107R and the first cutting member 105U moves toward the first coil 107R in response. The motion of the first cutting member 105U is immediately halted without decelerating motion at the point where the left stopper 139 of the first plate 125U encounters the left positioning member 141. Then, when the second coil 107L is magnetized, the plunger 109 is drawn into the second coil 107L and the first cutting member 105U moves toward the second coil 107L in response. The motion of the first cutting member 105U is abruptly halted without decelerating motion at the point where the right stopper 139 of the first plate 125U encounters the right positioning member 141. When the first cutting member 105U moves toward the first coil 107R and then toward the second coil 107U in accordance with the altenate magnetizing of the coils, reciprocating motion of the cutting members is obtained by repeating the moves to the first and second coils 107R, 107L and the halts at the points where the teeth 123U of the first cutting member 105U are superposed on the teeth 123L of the second cutting member 105L. This movement is represented by the dotted line on the graph of FIG. 3.

The first cutting member 105U halts immediately when the stoppers 139R, 139L encounter the positioning members 141R, 141L. Prior to the halt the member is moving without substantially decelerating motion at a substantially uniform speed. In short, the movement of the teeth 123U, 123L at the point where the teeth 123U are superposed on the teeth 123L, that is, where the teeth 123U, 123L are cutting the grass, is at a substantially uniform speed which is not reduced. As a result, the first and second cutting members 105U, 105L provide a superior cutting force. In addition, because the motion of the first cutting member 105U is not reduced, the upper teeth 123U can be superposed on the lower teeth 123L for a long time interval. Accordingly, the grass can easily enter between the teeth 123U, 123L to be cut. Therefore the amount of uncut grass is small. The operator can change the cycle of the action simply by changing a switch as required without changing the speed of the motion of the first cutting member 105U. Accordingly, even when the cycle of the action is modified, the cutting force of the cutting teeth 105U, 105L is maintained, and the operator can easily operate the mowing apparatus.

Figure 9:
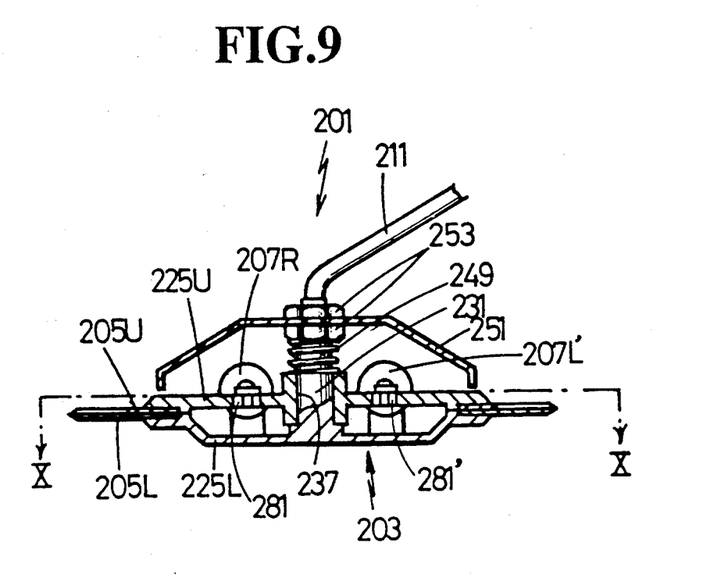
FIG. 9 is a sectional elevation of a second embodiment of the mowing apparatus of the present invention.
Figure 10:
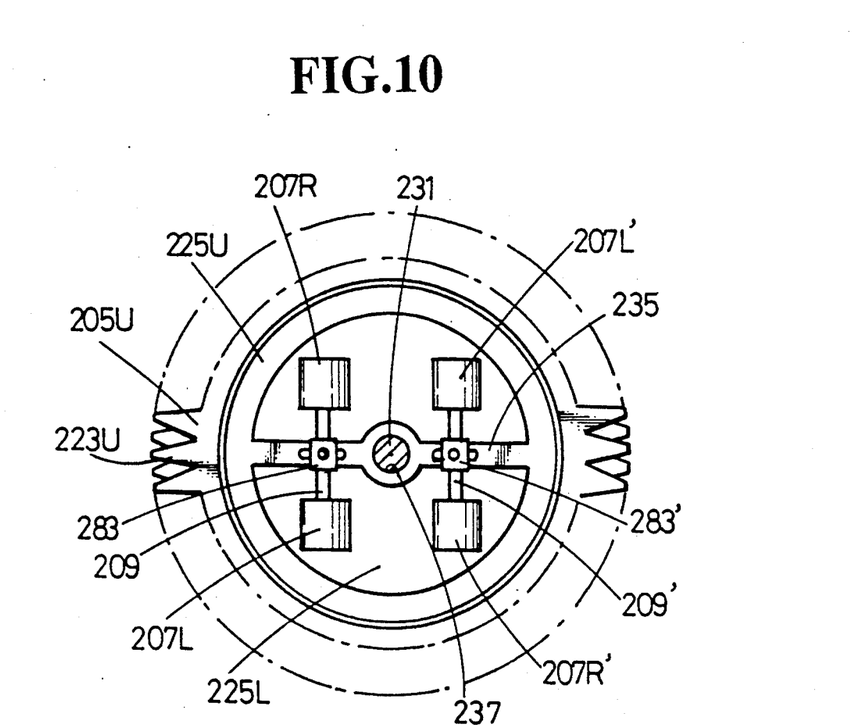
FIG. 10 is a sectional plan view taken along the line X—X of FIG. 9.

FIG. 9 and FIG. 10 show a second embodiment of the present invention. In this embodiment, a mowing apparatus 201 comprises a pair of ring-shaped first and second cutting disks 205U, 205L on a body 203. A plurality of teeth 223U, 223L are provided and disposed around the circular outer periphery of the first and second cutting disks 205U, 205L. The first cutting disk 205U is superposed on the second cutting disk 205L. The first cutting disk 205U is installed at the outer periphery of a ring-shaped first plate 225U; and the second cutting disk 205L is installed at the outer periphery of a saucer-shaped second plate 225L. A shaft 231 is integrally provided in the center portion of the upper surface of the second plate 225L, extending upward perpendicularly. A support member 235 is provided extending across the diameter of the first plate 225U, and a hole 237 is provided in the support member 235. At the hole 237 the support member 235 is rotatably supported to the shaft 231 on the second plate 225L through a bearing (not shown in the drawings). Two group of solenoid mechanism assemblies are mounted on the second plate 225L. In detail, the support member 235 is provided with two guide channels 281, 281' extending radially. The guide channels 281, 281' are symmetrically positioned relative to the center of the hole 237. Two sliders 283, 283' is provided in such a manner that sliders may be slidable in the guide channel 281, 281' and horizontally rotatable, respectively. The plungers 209, 209' of the solenoids are mounted on the sliders 283, 283', respectively. The two groups of first and second coils 207R, 207L and 207R', 207L' are secured to the second plate 225L. The two first coils 207R and 207R', and the two second coils 207L and 207L', respectively, are symmetrically positioned relative to the centers of the hole 237. The two groups of first and second coils 207R, 207L and 207R', 207L' are provided with alternate current flows same as the first embodiment in a manner allowing the corresponding coils in the two groups to be simultaneously powered at any particular time.

In this structure, when the current flows through the first coils 207R, 207R', the first coils 207R, 207R' are magnetized in the same manner as in the first embodiment and the plungers 209, 209' are attached into the first coils 207R, 207R' at a substantially uniform speed. Accordingly, the sliders 283, 283', on which the plungers 209, 209' are mounted, slide along the guide channels 281, 281'. The first plate 225U centered around the shaft 231 is pivoted at a substantially uniform speed in the clockwise direction in FIG. 10, then halted when the plungers 209, 209' abut on stoppers included in the first coils 207R. When the current to the first coils 207R, 207R' is cut and current is supplied to the second coils 207L, 207L', the second coils 207L, 207L', are magnetized and the plungers 209, 209' are drawn into the second coils 207L, 207L'. The sliders 283, 283' slide along the guide channels 281, 281'. The first plate 225U is pivoted in the opposite direction, that is, the counterclockwise direction. Accordingly, when the current flows alternately through the first and second coils 207R, 207R', 207L, 207L', the sliders 283, 283' move reciprocatingly along the guide channels 281, 281', and the first plate 225U pivots at a substantially uniform speed and reciprocatingly oscillates.

In this embodiment, as in the first embodiment, a pair of stoppers can be provided integrally on the first plate and a pair of positioning members which encounter the stoppers can be provided on the second plate. Each positioning member can be secured in a position so that the motion of the cutting disks is halted when the positioning member is encountered by the stopper on the plate when the teeth of the first cutting disk are exactly overlapped the teeth of the second cutting disk. An elastic body can be mounted as a shock absorbing member on the part of the positioning member encountered by the stopper. With this configuration, when a current flows alternately in the first and second coils 207R, 207L and 207R', 207L', the motion in the oscillating action of the first cutting disk 205U is reliably halted by the stopper and the positioning means when the upper and lower teeth 223U, 223L of the cutting disks are superposed.

A cover 251 which covers the first plate 225U is secured with two nuts 253 to the upper end of the shaft 231 of the second plate 225L. In addition, a spring 249 of an initially corned disk spring or the like is installed between the hole 237 of the shaft 231 and the nut 253 as biasing means. The first plate 225U is pressed toward the second plate 225L by the spring 249 so that the first cutting disk 205U does not float.

An operation rod 211 is installed at the upper center portion of the cover 251. A control unit 215 is provided on the operation rod 211 in the same manner as in the first embodiment. The construction of the control unit 215 is indentical to that of the first embodiment excepting for the configuration for possessing the two groups of coils 207R, 207L and 207R' 207L', so further explanation is omitted.

In the construction outlined above, when the operator throws the main switch 121, the motor 159 rotates and the rotary switch 157 is switched based on the specified switching cycle. The two groups of coils 207R, 207L and 207R', 207L' are alternately magnetized as the current flows through each alternately. The plungers 209, 209' are reciprocally attracted into the first and second coil 207R, 207L and 207R', 207L' at a substantially uniform speed, according to the specified switching cycle, and then stop. Accordingly, the sliders 283, 283' slide reciprocatingly in the guide channels 281, 281' and the support member 215 pivots reciprocatingly at a substantially uniform speed. The first plate 225U and the first cutting disk 205U move at a substantially uniform speed and stop, then repeat the motion cycle, providing oscillating action.

In the above embodiments, an actuator operated by a solenoid mechanism is used as the moving means. However, a hydraulic activating mechanism operated by oil or air can also be used. In such a case a solenoid valve may be used to control the direction of the hydraulic fluid. This solenoid valve is switched by the rotary switch.

In addition, the solenoid mechanism may be provided with one coil and an elastic tension member instead of two coils. Also, magnets can be used instead of the plungers or coils.

An electronic circuit using transistors, thyristors, timers, and the like can be used as a switching means for the moving means.

Further, instead of one of the two cutting disks being fixed it is, of course, also possible to use a configuration wherein both cutting disks move reciprocatingly in opposite directions.

The present invention can also be applied to an attachment for a constructionn machine or an industrial machinery.

It must be understood that the invention is in no way limited to the above embodiments and that many changes may be brought about therein without departing from the scope of the invention as defined by the appended claims.

What is claimed is:

1. A mowing apparatus comprising:
a pair of first and second cutting members slidably superposed with each other, each of the cutting members including a plurality of aligned cutting teeth;
means for reciprocally moving the first cutting member relative to the second cutting member between a first position where one of the teeth of the first cutting member is superposed on one of the teeth of the second cutting member and a second position where said one of the teeth of the first cutting member is superposed on a tooth adjacent to said one of the teeth of the second cutting member in the direction of the aligned cutting teeth without decelerating the first cutting member; and
a drive source for driving the moving means.

2. The mowing apparatus of claim 1, wherein each of the aligned cutting teeth of the first and second cutting members are arranged in a straight line at uniform intervals, the first cutting member is reciprocally movable with deceleration in the direction of the aligned cutting teeth, and the second cutting member is fixed.

3. The mowing apparatus of claim 2, wherein the moving means comprises an actuator driven by the energy supplied from the drive source, and the actuator having an actuating rod which is reciprocatingly movably within a predetermined stroke and connected to the first cutting member.

4. The mowing apparatus of claim 3, further comprising switching means provided between the drive source and the moving means of enabling the reciprocal motion of the movable actuating rod the actuator.

5. The mowing apparatus claim 4, wherein the actuator comprises a solenoid mechanism.

6. The mowing apparatus of claim 5, wherein the solenoid mechanism comprises first and second coils and a plunger reciprocatingly movably between the first and second coils, the plunger is connected to the first cutting member, and the switching means alternately switches the first and second coils ON, thereby causing the first and second coils to become magnetized alternately to attract the plunger alternately so that the first cutting member to which the plunger is connected is moved reciprocally without deceleration in accordance with the motion of the plunger.

7. The mowing apparatus of claim 6, wherein the switching means is constituted so as to be switched in a predetermined uniform cycle.

8. The mowing apparatus of claim 7, wherein the switching means comprises a rotary switch and a motor which is coupled to the rotary switch so that the rotary switch is switched in accordance with the rotation of the motor, whereby the first cutting member repeats its motions in the predetermined uniform cycle.

9. The mowing apparatus of claim 8, wherein the motor of the switching means is capable of modifying the rotation cycle of the motor of the switching means.

10. The mowing apparatus of claim 9, wherein the modification of the rotation cycle of the motor is performed by an electric circuit which is electrically connected between the motor and the drive source, in which the resistance value of the circuit can be selectively modified.

11. The mowing apparatus of claim 1, wherein the moving means further comprises means for stationarily halting the motion of the first cutting member immediately when the teeth of the two cutting members reach in the superposed condition.

12. The mowing apparatus of claim 3, wherein the stroke of the actuating rod is approximately adjusted to the moving range of the first cutting member relative to the second cutting member so that the first cutting member is immediately halted when the teeth of the first and second cutting members reach the superposed condition.

13. The mowing apparatus of claim 11, wherein the stationarily halting further comprises:
a stopper integrally provided on the first cutting member; and
a positioning member provided on the second cutting member having a part which abuts the stopper.

14. The mowing apparatus of claim 13, wherein the positioning member has a part which abuts the stopper, and an elastic body is provided on the part of the positioning member or on the stopper.

15. The mowing apparatus of claim 1, further comprising means for biasing one the first and second cutting members toward the other cutting member.

16. The mowing apparatus of claim 15, wherein the biasing means comprises a spring for biasing the first cutting member against the second cutting member in such a manner that the first and second cutting members are pressed together.

17. The mowing apparatus of claim 1, wherein each of the first and second cutting members has a circular outer periphery, the aligned teeth are arranged along the circular periphery, and the cutting members are constituted so that the first cutting member oscillates relative to the second cutting member.

18. The mowing apparatus of claim 17, wherein the moving means comprises at least one actuator having a reciprocatingly movable actuating rod connected to the first cutting member.

19. The mowing apparatus of claim 17, wherein the first cutting member is provided with a radial guide channel, and the actuating rod is slidably fitted to the guide channel to rotate the first cutting member in accordance with the reciprocal motion of the actuating rod.

20. The mowing apparatus of claim 17, wherein the actuator comprises a solenoid mechanism.

* * * * *

UNITED STATES PATENT AND TRADEMARK OFFICE
CERTIFICATE OF CORRECTION

PATENT NO. : 5,050,373

DATED : September 24, 1991

INVENTOR(S) : K. ASATSUMA

It is certified that error appears in the above-identified patent and that said Letters Patent is hereby corrected as shown below:

On the Cover, paragraph [56] U.S. Patent Documents, change the sixteenth patent listed, "4,004,065" to ---4,094,065---.
On the Cover, paragraph [57] Abstract, line 14, insert ---, which--- after "a switch".
At column 1, line 25, insert ---,--- after "7".
At column 1, line 67, change "according" to ---accordingly---.
At column 2, line 61, insert ---,--- after "that is".
At column 2, line 62, insert ---,--- after "operation".
At column 3, lines 59 and 60, change "extending" to ---extends---.
At column 5, line 1, delete ---inside---.
At column 5, line 14, change "abuted" to ---abutted---.
At column 5, line 35, change "pull" to ---pulls---.
At column 6, line 59, change "altenate" to ---alternate---.
At column 6, line 62, change "the halts" to ---then halts---.
At column 7, line 42, change "group" to ---groups---.
At column 7, line 47, change "is" to ---are---.
At column 8, line 49, change "indentical" to ---identical---.
At column 9, line 19, change "constructionn" to ---construction---

Signed and Sealed this

Twelfth Day of October, 1993

*Attest:*

BRUCE LEHMAN

*Attesting Officer*     *Commissioner of Patents and Trademarks*